No. 633,801. Patented Sept. 26, 1899.
A. DE CASTRO.
MEANS FOR UTILIZING GALVANIC CELLS OR BATTERIES.
(Application filed July 28, 1898.)
(No Model.)
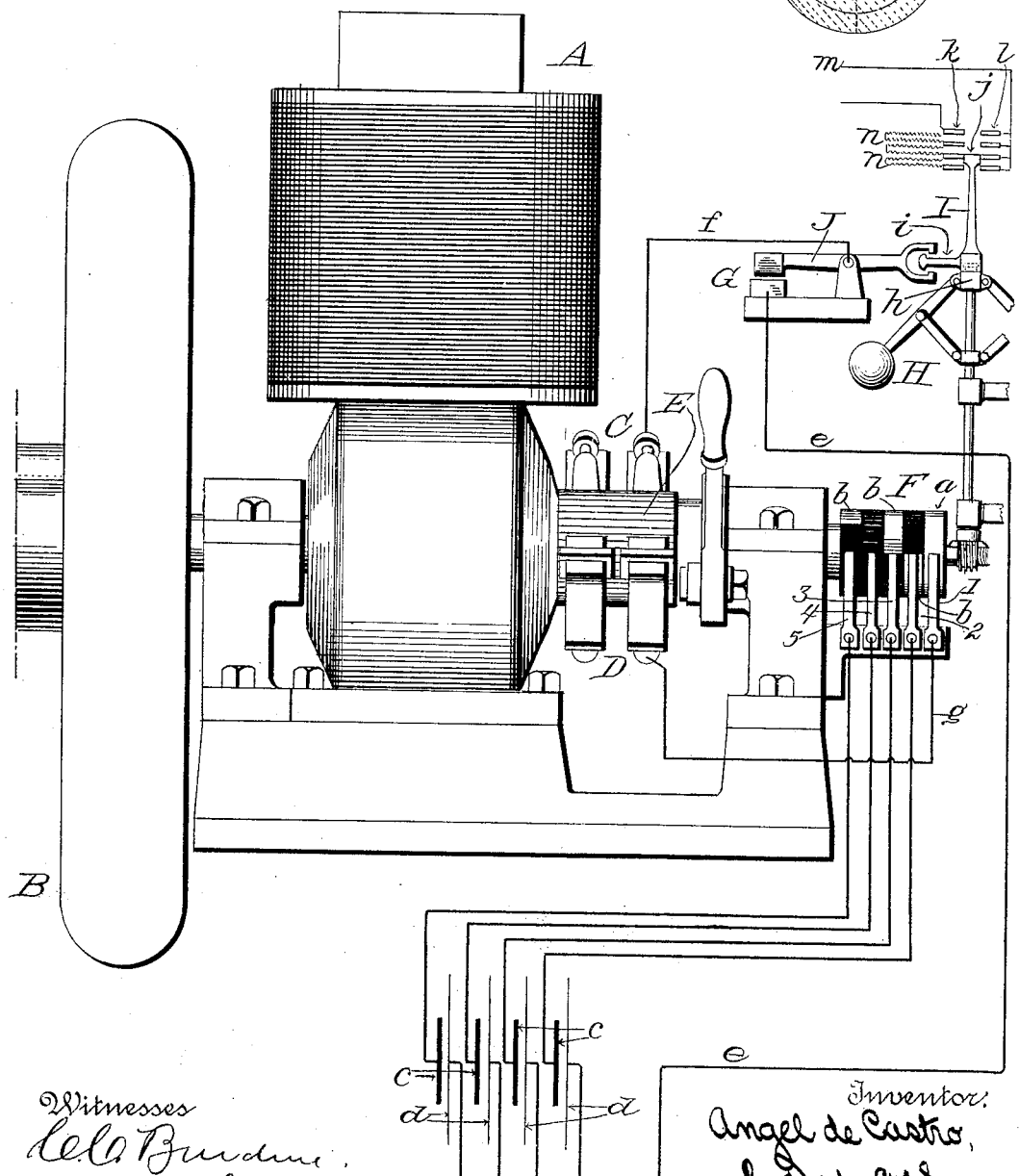

UNITED STATES PATENT OFFICE.

ANGEL DE CASTRO, OF NEW YORK, N. Y., ASSIGNOR OF ONE-HALF TO JOAQUIN FERRO, OF SAME PLACE.

MEANS FOR UTILIZING GALVANIC CELLS OR BATTERIES.

SPECIFICATION forming part of Letters Patent No. 633,801, dated September 26, 1899.

Application filed July 28, 1898. Serial No. 687,137. (No model.)

*To all whom it may concern:*

Be it known that I, ANGEL DE CASTRO, a citizen of the United States, residing at New York, in the county of New York and State of New York, have invented certain new and useful Improvements in Methods of and Means for Utilizing Galvanic Cells or Batteries, of which the following is a specification.

My invention relates to means for utilizing galvanic cells or batteries for operating motors and performing like work requiring a long-continuing current.

It is well known that many forms of cells exist capable of giving a comparatively strong current for a limited time, but that when such cells are kept continuously in circuit they rapidly lose their power and in comparatively short time become temporarily useless. When such cells are disconnected from the circuit or when the circuit is opened, they recover in a greater or less degree their lost power and may be used as before, or practically so. My invention aims to render possible the use of such cells for maintaining for considerable periods of time a current of sufficient volume and intensity to operate electric motors of moderate size, which in turn may perform any suitable kind of labor.

The embodiment of the invention may be varied as to details without departing from the spirit or scope thereof; but the arrangement illustrated in the accompanying drawings and now explained is deemed advantageous because of its simplicity and economy.

In the drawings, Figure 1 is a diagrammatic elevation of a motor and the apparatus necessary for supplying the same with current according to my plan, and Fig. 2 a sectional view of the circuit-making cylinder used in connection therewith.

Briefly stated, the principle involved in the supplying of the motor with current from battery-cells consists in bringing the respective cells or respective groups of cells into action successively and for brief periods, so that each may have short intervals for recuperation, in cutting out of circuit at intervals and for more or less considerable periods of time all the cells or groups of cells, and, lastly, in maintaining the rotation of the motor-armature through employment of a heavy fly-wheel, in which the power exerted by the current during its periods of action is stored and through which it is given back to the motor when the latter is without current. These results are attained, preferably, through employment of a rotating switch, which brings successively into circuit the several cells or groups of cells, and through the aid of a governor, which when the speed of the motor reaches a given point opens a switch and breaks the circuit, so that the cells may no longer deliver current to the motor. By the aid of these means, coupled with the heavy fly-wheel, which maintains the motion of the motor-armature for a considerable period of time, during which the cells are enabled to recover their strength, it is possible to utilize such cells practically and successfully for the actuation of small motors.

Referring again to the drawings, A indicates a motor, which may be of any approved type and which is provided with a fly-wheel B of greater weight than would ordinarily be employed with a motor of like dimensions, this being necessary in order to maintain the rotation of the armature at substantially its full speed through those periods of time during which the battery is cut out.

C and D indicate the commutator-brushes, which bear upon the commutator-cylinder E and lead the current to and from the armature-winding.

F indicates a rotary switch-cylinder, here represented as comprising one complete metallic ring $a$ and four quadrant-shaped sections $b$, set at different angular distances about the axis of the cylinder F, all electrically connected through an inner sleeve. In other words, each section $b$ extends one-quarter of the way about the circumference of the drum or cylinder F, and no two of said sections are included within the same quadrant of the circle or circumference.

Bearing upon the circumference of the cylinder F are five contact springs or brushes 1, 2, 3, 4, and 5, each in line with one of the contacts $a$ or $b$, as seen in Fig. 1. Each of the contacts 2, 3, 4, and 5 is in electrical connection with one pole or element $c$ of a cell or battery of its own. The opposite pole or element $d$ of each cell or battery is in electrical connection with a common conductor $e$, which passes to one member of a switch G, the other member of which is connected by a conductor $f$ with the brush C of the motor. The contact spring or brush 1 is electrically connected by a conductor $g$ with the brush D of the motor. It will be seen that under this arrangement current will pass from the element $d$ of one or another of the cells or batteries by the conductor $e$, switch G, and conductor $f$ to the brush C, thence by the commutator to the armature-winding, thence by the brush D and conductor $g$ to contact-spring 1, thence by the contact-ring $a$ and that one of the contact-springs 2, 3, 4, or 5 which at the moment bears upon a metallic contact-section $b$ back to the terminal or element $c$ of the cell or battery with which that particular contact-spring is electrically connected. As a consequence of this arrangement current will be delivered to the motor and its armature will begin to rotate. In rotating it will bring the sections $b$ successively beneath or into contact with the springs 2, 3, 4, and 5, and in this way the separate cells or groups of cells will be successively brought into and cut out of action, each for a brief period. Assuming that four cells or four groups of cells be employed, as here indicated, each will be brought into and maintained in action through one-quarter of a revolution of the shaft and will be out of action through the remaining three-quarters, so that while for an instant it is delivering current to the motor it will be for three times as long out of action, during which period it will be able to recover in greater or less degree its generative power.

The foregoing statement contemplates a closed condition of the switch G, which will be its condition when the motor begins its operation and until a predetermined high rate of speed is attained. When such speed is reached and sufficient power is stored in the heavy fly-wheel B to insure the maintaining of proper motion in the armature for a reasonable length of time, the switch G is opened. This opening of the switch is accomplished through the aid of a governor H, here represented as of the ball type and having its upper sleeve $h$ capable of movement vertically. Swiveled to the movable sleeve $h$ is a vertically-movable member I, provided with a horizontally-projecting arm $i$, which taking up the two arms of the forked end of a switch-lever J moves the circuit-closing end of the switch up or down, according to the descent or ascent of the movable collar $h$ of the governor. In other words, as the speed increases and the balls of the governor ascend the collar $h$ is drawn down and the circuit-making end of the switch-arm J is upon the attainment of given speed by the motor lifted out of contact with its coacting member, thus interrupting the supply-circuit of the motor.

From what has been said it will be apparent that the several cells or groups of cells are successively brought into and thrown out of action with frequency and during the time required to bring the motor up to its predetermined speed, and when such speed is attained all the cells or batteries are cut out of circuit and allowed to recover for a greater or less period of time, during which the fly-wheel maintains the motion of the armature. As the speed decreases and when it falls below a certain point the governor moves the switch-lever J in a direction to restore the circuit connections, whereupon the cells or groups of cells are again brought into action in close succession, as in the first instance. In order that the action of the switch G may not follow upon the first slight decrease in speed of the motor, a limited play of lost motion is allowed between the arm $i$ and the arms of the forked end of lever J, thus permitting the arm $i$ to ascend some little distance before again closing the switch G. To avoid driving the governor at an unduly-high speed, it may be geared in any suitable manner to the armature-shaft, or it may be connected by belting or other reducing means, a simple worm-gear being represented in the drawings.

In many cases—as, for instance, where the motor is employed to actuate a small generator to supply current to several lamps—it is desirable that a greater or less resistance be thrown into the circuit, according to the increased speed of the motor and generator. To accomplish this, the member I may be provided with a contact-block $j$, which bridging the space between contact-blocks $k$ and $l$, arranged in two groups or series and respectively connected with different ends of a separated conductor $m$, brings in a larger or smaller number of resistances $n$, according to the fall or rise of the contact $j$.

The particular construction and arrangement of this resistance device, as also that of the switch G and other details, may be varied considerably without departing from the spirit and scope of my invention, the essence of which resides in the successive introduction and elimination of the cells or batteries first in their individual capacities and then as a group or whole.

Having thus described my invention, what I claim is—

1. In combination with an electric motor provided with a fly-wheel; a series of cells or groups of cells; a switch for throwing said cells or groups of cells into and out of circuit in quick succession and at frequently-recurring periods; a governor; and a switch controlled by said governor and serving to cut the cells or groups of cells out of circuit with the motor when the speed reaches a predetermined maximum and to restore them to the circuit when the speed falls to a predetermined minimum; whereby the cells are each given frequent periods of inaction in which to recover, and all are given longer periods of recovery when given speed is attained.

2. The combination, substantially as set forth, of a motor A provided with a fly-wheel B; brushes C and D; commutator-cylinder E; switch-cylinder F provided with contacts $a$ and $b$; contact-springs 1, 2, 3, 4 and 5; cells $c$, $d$; and contacts connecting the cells, the contact-springs and the brushes, substantially as and for the purpose set forth.

3. In combination with a motor; cells or batteries, and switch mechanism for bringing the cells or batteries into action successively or at different moments and removing them from circuit in like manner; a governor; an external circuit provided with a series of resistances; and a contact controlled by said governor and serving to introduce into the external circuit a greater or less resistance according to increase or decrease in the speed of the motor.

In witness whereof I hereunto set my hand in the presence of two witnesses.

ANGEL DE CASTRO.

Witnesses:
J. J. CARROLL,
JAMES P. J. MORRIS.